United States Patent
Khlat

(10) Patent No.: US 8,552,816 B2
(45) Date of Patent: Oct. 8, 2013

(54) MULTIBAND SIMULTANEOUS TRANSMISSION AND RECEPTION FRONT END ARCHITECTURE

(75) Inventor: Nadim Khlat, Midi-Pyrenees (FR)

(73) Assignee: RF Micro Devices, Inc., Greensboro, NC (US)

( * ) Notice: Subject to any disclaimer, the term of this patent is extended or adjusted under 35 U.S.C. 154(b) by 378 days.

(21) Appl. No.: 12/969,867

(22) Filed: Dec. 16, 2010

(65) Prior Publication Data
US 2011/0234335 A1  Sep. 29, 2011

Related U.S. Application Data

(60) Provisional application No. 61/316,712, filed on Mar. 23, 2010, provisional application No. 61/390,667, filed on Oct. 7, 2010.

(51) Int. Cl.
*H03H 7/46* (2006.01)
*H04B 1/44* (2006.01)
*H04B 1/50* (2006.01)
*H04B 7/00* (2006.01)
*H04M 1/00* (2006.01)

(52) U.S. Cl.
USPC ............... 333/132; 333/129; 455/78; 455/83; 455/552.1; 370/277; 370/282

(58) Field of Classification Search
USPC ................... 333/126, 129, 132–135; 455/78, 455/82, 83, 552.1, 553.1, 103, 132; 370/277, 370/278, 282, 273, 275
See application file for complete search history.

(56) References Cited

U.S. PATENT DOCUMENTS

| | | | |
|---|---|---|---|
| 5,794,159 A * | 8/1998 | Portin | 455/553.1 |
| 5,815,804 A * | 9/1998 | Newell et al. | 455/78 |
| 8,155,608 B2 * | 4/2012 | Xing et al. | 455/132 |
| 2004/0224643 A1 | 11/2004 | Nakai | |
| 2009/0247092 A1 * | 10/2009 | Beaudin et al. | 455/73 |
| 2010/0069020 A1 | 3/2010 | Koya et al. | |
| 2011/0237207 A1 * | 9/2011 | Bauder | 455/78 |
| 2011/0292844 A1 * | 12/2011 | Kwun et al. | 370/278 |

FOREIGN PATENT DOCUMENTS
JP    2006-262314    * 9/2006

OTHER PUBLICATIONS
International Search Report for PCT/US2011/029136 mailed Aug. 29, 2011.

* cited by examiner

*Primary Examiner* — Barbara Summons
(74) *Attorney, Agent, or Firm* — Withrow & Terranova, P.L.L.C.

(57) ABSTRACT

A user equipment (UE) front end (FE) that is adapted for multiband simultaneous transmission and reception is provided. The UE FE includes a first multi-filter device having a transmit (TX) band-pass filter adapted to pass a first TX signal band associated with a first radio access technology type, and a receive (RX) band-pass filter adapted to pass a second RX signal band associated with a second radio access technology type. The UE FE also includes a second multi-filter device having a TX band-pass filter adapted to pass a second TX signal band associated with the second radio access technology type and an RX band-pass filter adapted to pass the first RX signal band associated with the first radio access technology type. The first radio access technology type and the second radio access technology type are preferably long term evolution (LTE) and code division multiple access 2000 (CDMA2000), respectively, or vice versa.

22 Claims, 15 Drawing Sheets

MULTIBAND SIMULTANEOUS TRANSMISSION AND RECEPTION FRONT END ARCHITECTURE

RELATED APPLICATIONS

This application claims the benefit of provisional patent application Ser. No. 61/316,712, filed Mar. 23, 2010, and provisional patent application Ser. No. 61/390,667, filed Oct. 7, 2010, the disclosures of which are hereby incorporated herein by reference in their entireties.

FIELD OF THE DISCLOSURE

The present disclosure relates to a user equipment (UE) adapted to transmit and receive voice and data simultaneously over a cellular network.

BACKGROUND

Conducting simultaneous transmission and reception of voice and data for a user equipment (UE) such as a mobile terminal for communicating with a base transceiver station (BTS) is highly desirable. In order to achieve simultaneous transmission and reception of voice and data, multiband transmitters and multiband receivers within a single UE are necessary. However, asymmetrical inter-modulation products resulting from non-equal transmitter levels (i.e., β delta ratio) of separate transmit (TX) paths greatly complicate a practical realization of simultaneous transmission and reception of voice and data. What is needed is a UE front end (FE) that is adapted for multiband simultaneous transmission and reception of voice and data.

SUMMARY

The present disclosure provides a user equipment (UE) front end (FE) that is adapted for multiband simultaneous transmission and reception of voice and data. The UE FE includes a first multi-filter device having a transmit (TX) band-pass filter adapted to pass a first TX signal band associated with a first radio access technology type and a receive (RX) band-pass filter adapted to pass a second RX signal band associated with a second radio access technology type. The UE FE also includes a second multi-filter device having a TX band-pass filter adapted to pass a second TX signal band associated with the second radio access technology type and an RX band-pass filter adapted to pass a first RX signal band associated with the first radio access technology type. Another embodiment includes notch filters that provide improved isolation of third order inter-modulation (IM3) products.

In one embodiment, the first multi-filter device and the second multi-filter device are duplexers, and in other embodiments, they may be triplexers. The first radio access technology type and the second radio access technology type are preferably long term evolution (LTE) and code division multiple access 2000 (CDMA2000), respectively, or vice versa. In one embodiment, the first multi-filter device further includes a diversity RX band-pass filter adapted to pass a first RX diversity signal band associated with the first radio access technology type. In this embodiment, the first multi-filter device will be a triplexer.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
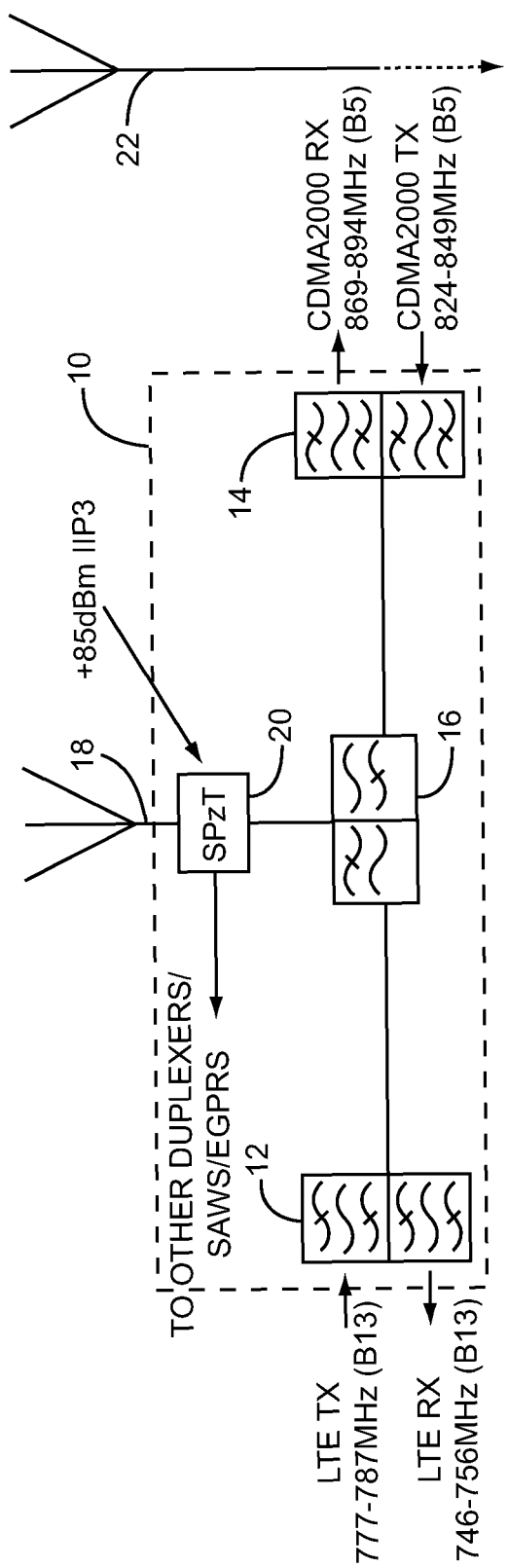
FIG. 1 is a block diagram of a prior art front end module (FEM) having first and second duplexers coupled to a diplexer that is selectively coupled to an antenna through a radio frequency (RF) switch.

FIG. 1 is a block diagram of a prior art front end module (FEM) 10 having a first duplexer 12 and a second duplexer 14 that are coupled to a diplexer 16, which in turn is selectively coupled to a transmit and receive (T/R) antenna 18 through a radio frequency (RF) switch 20. The RF switch 20 is a single pole multi-throw (SPzT) switch, where z represents the number of switch throws. The first duplexer 12 includes a transmit (TX) band-pass filter for passing a TX band of a first radio access technology type, and a receive (RX) band-pass filter for passing an RX band of the first radio access technology type. In the case of the FEM 10, the first radio access technology type is long term evolution (LTE). Similarly, the second duplexer 14 includes a TX band-pass filter for a passing a TX band of a second radio access technology type, and an RX band-pass filter for passing an RX band of the second radio access technology type. In the case of FEM 10, the second radio access technology type is code division multiple access 2000 (CDMA2000). A diversity receive antenna 22 is typically available in a user equipment (UE) (not shown) incorporating the FEM 10, but the antenna 22 is for diversity reception only. Thus, the antenna 22 is not usable for simultaneously transmitting voice and data.

There are several disadvantages to using the FEM 10 for simultaneous voice and data communication. A first disadvantage lies in the fact that a frequency separation between the LTE band 13 (B13) and CDMA2000 band 5 (B5) is relatively small. As a result, the diplexer 16 requires relatively sharp filter edges that necessitate a relatively large number of passive components. Consequently, the diplexer 16 will have a relatively large insertion loss (IL). In order to prevent passing this relatively large IL to other bands for radio access technology types such as enhanced general packet radio service (EGPRS), the RF switch 20 is inserted between the diplexer 16 and the T/R antenna 18. However, a second disadvantage is introduced by the RF switch 20 because the RF switch 20 must be designed to withstand two RF carriers that are transmitted at a relatively high power. For example, the RF switch 20 will typically pass an LTE RF carrier at +20 dBm average power along with a CDMA2000 RF carrier at +20 dBm average power. Accordingly, the linearity requirement for the RF switch 20 can have an inter-modulation intercept point 3 (IIP3) as large as +85 dBm in order to limit third order inter-modulation (IM3) products to −110 dBm in the CDMA2000 receive bands. Designing the RF switch 20 to meet this relatively high level of IIP3 presents a relatively difficult engineering challenge that at best requires expensive components to implement.

Figure 2:
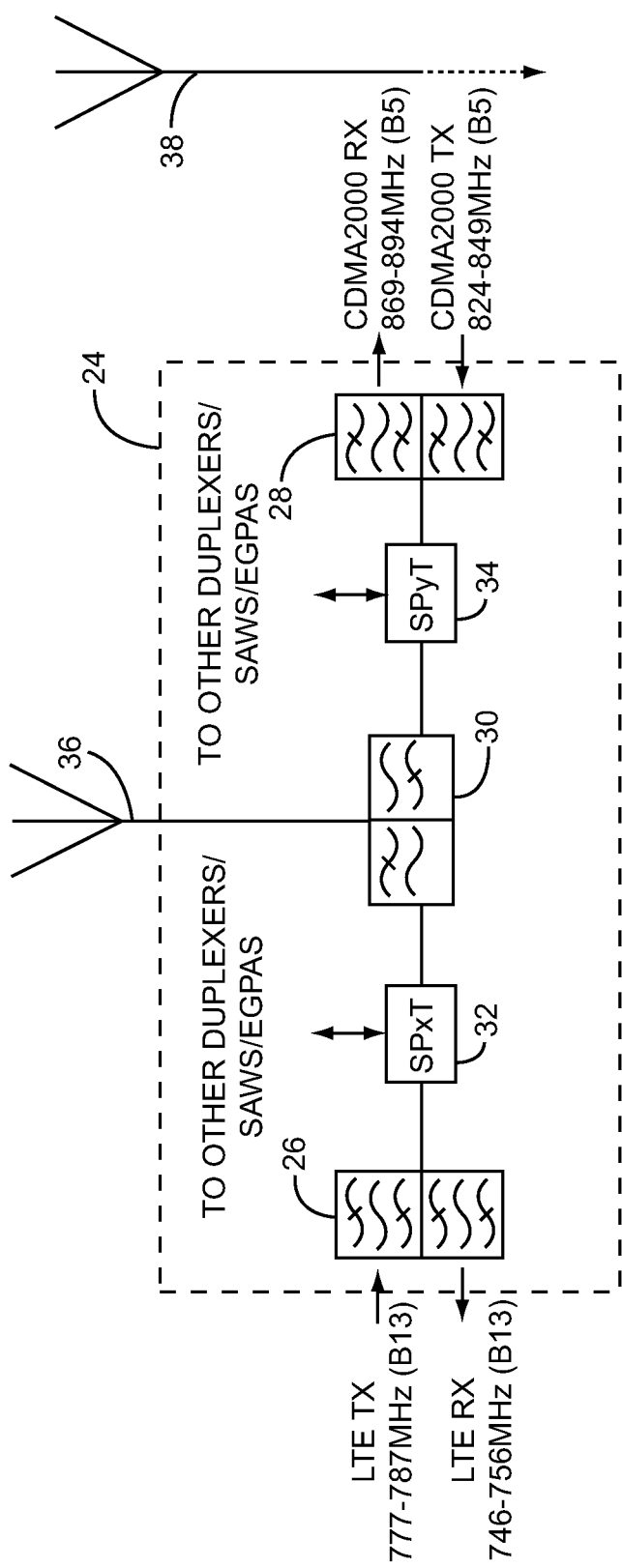
FIG. 2 is a block diagram of a prior art FEM having a first duplexer coupled to a diplexer through a first RF switch and a second duplexer that is coupled to the diplexer through a second RF switch, wherein the diplexer is coupled to an antenna.

FIG. 2 is a block diagram of another prior art FEM 24 having a first duplexer 26 and a second duplexer 28 that are selectively coupled to a diplexer 30 through a first RF switch 32 and a second RF switch 34, respectively. The diplexer 30 is coupled directly to a T/R antenna 36. Like the diversity receive antenna 22 (FIG. 1), a diversity receive antenna 38 is typically available in a UE (not shown) that incorporates the FEM 24, but the diversity receive antenna 38 is for diversity reception only. Thus, the diversity receive antenna 38 is not usable for simultaneously transmitting voice and data.

Figure 3:
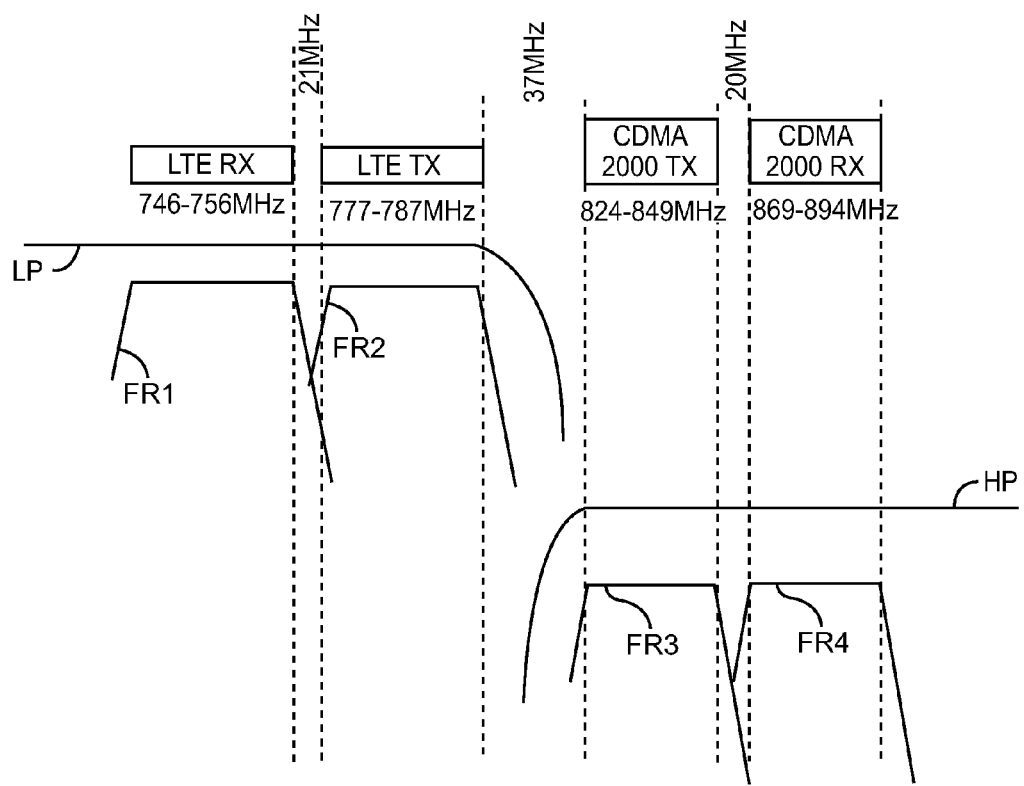
FIG. 3 is a spectrum diagram depicting the pass bands for the first and second duplexers and the diplexer for the FEM depicted in FIG. 2.

FIG. 3 depicts frequency responses FR1 and FR2 for the duplexer 26, and frequency responses FR3 and FR4 for the second duplexer 28. FIG. 3 also depicts a low pass frequency response LP, and a high pass frequency response HP for the diplexer 30. The FEM 24 (FIG. 2) offers an advantage over the FEM 10 (FIG. 1) in that the requirement for a single RF switch having an IIP3 of +85 dBm is relaxed. However, as shown in FIG. 3, an isolation of −35 dB is required for a narrow frequency separation of 37 MHz between the LTE TX band and the CDMA2000 TX band. In particular, for an isolation of −35 dB, a +20 dBm TX power applied to either the first RF switch 32 (FIG. 2) or the second RF switch 34 is reduced to a blocker power of −15 dBm. Consequently, the IIP3 requirements for the first RF switch 32 and the second RF switch 34 are within limits of existing CDMA2000 requirements. However, achieving −35 dB of isolation while realizing the narrow frequency separation of 37 MHz between the LTE TX band and the CDMA2000 TX band results in relatively large ILs for the first RF switch 32 and the second RF switch 34. These relatively large ILs negatively impact the performances of the transmission and the reception of LTE signals and CDMA2000 signals, as well as other TX and RX bands. While the FEM 24 (FIG. 2) offers the advantage of improved IIP3 requirements over the FEM 10 (FIG. 1), a challenging engineering trade-off between requirements for isolation, ILs, and IIP3 remains.

Figure 4:
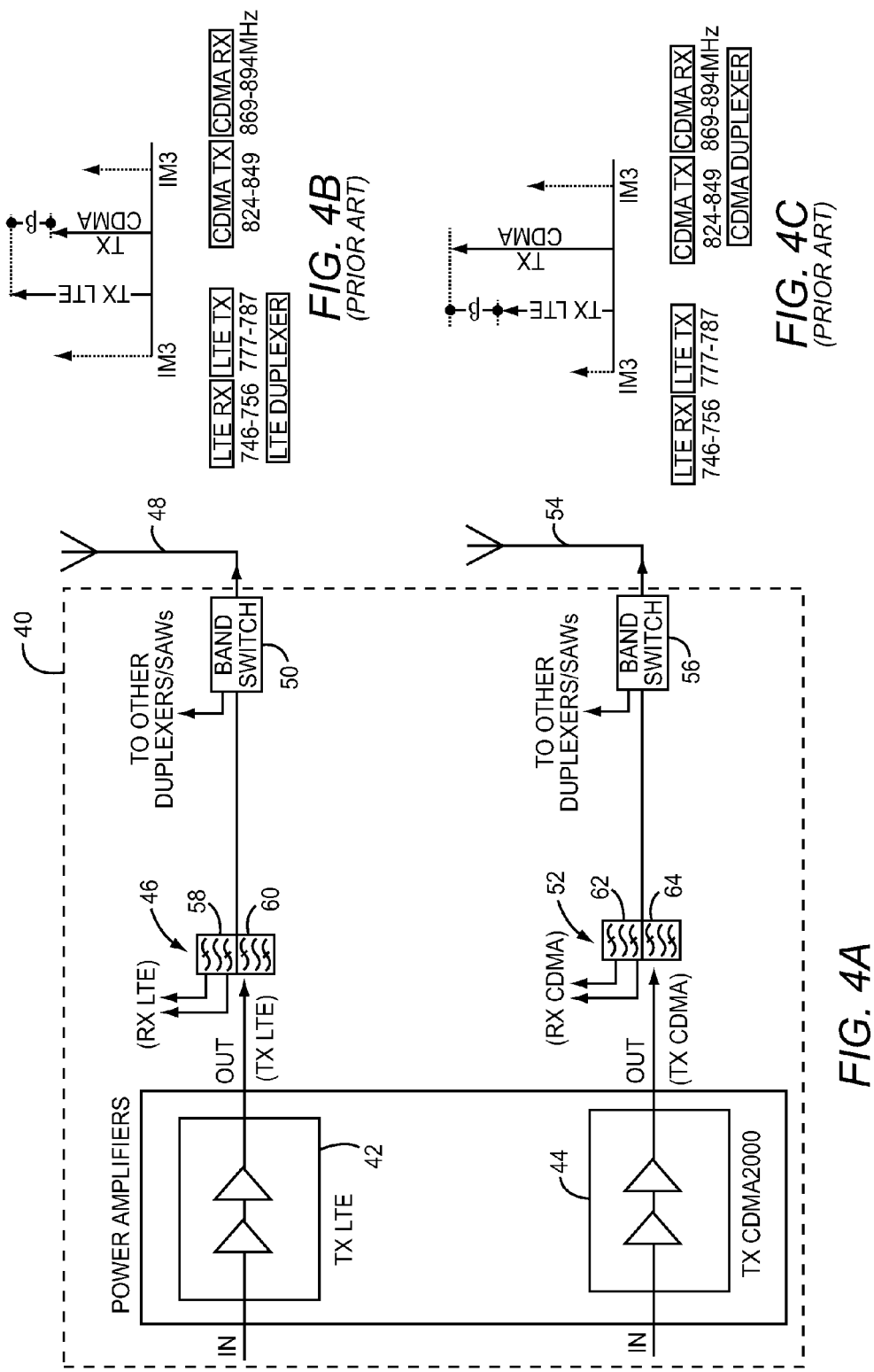
FIG. 4A is a block diagram of a prior art FEM having first and second transmitters coupled to first and second antennas through first and second duplexers and RF switches.
FIG. 4B is a spectrum diagram showing a larger of two third order inter-modulation (IM3) products falling within a receive (RX) band of long term evolution (LTE).
FIG. 4C is a spectrum diagram showing the larger of two IM3 products falling within an RX band of code division multiple access 2000 (CDMA2000).

FIG. 4A is a block diagram of yet another prior art FEM 40. The FEM 40 includes a first power amplifier (PA) 42 for amplifying RF signals in the TX band of a first radio access technology type, and a second PA 44 for amplifying RF signals in the TX band of a second radio access technology type. In this case, the first radio access technology type is LTE having a 700 MHz TX band, and the second radio access technology type is CDMA2000 having an 800 MHz TX band. The FEM 40 also includes a first multi-filter device 46 that is coupled to an output of the first PA 42 and communicatively coupled to a first T/R antenna 48 through a first band switch 50. The FEM 40 further includes a second multi-filter device 52 that is coupled to an output of the second PA 44 and communicatively coupled to a second T/R antenna 54 through a second band switch 56.

In the particular case of the FEM 40, the first multi-filter device 46 is a duplexer having an RX band-pass filter 58 for passing signals within an LTE RX band, and a TX band-pass filter 60 for passing signals within an LTE TX band. The second multi-filter device 52 is a duplexer that includes an RX band-pass filter 62 for passing signals within a CDMA2000 RX band, and a TX band-pass filter 64 for passing signals within a CDMA2000 TX band.

Turning now to FIG. 4B, a β isolation due to the physical separation of the first antenna 48 (FIG. 4A) and the second antenna 54 (FIG. 4A) is shown. Also shown are the relative magnitudes of the IM3 products generated by an inter-modulation of LTE and CDMA2000 signals. Notice that the larger magnitude IM3 product falls within the RX LTE band. Thus, the larger magnitude IM3 product is passed by the RX band-pass filter 58, which results in the desensitizing of an LTE receiver (not shown) that receives signals passed through the RX band-pass filter 58.

FIG. 4C shows the same β isolation between the first T/R antenna 48 (FIG. 4A) and the second T/R antenna 54 (FIG. 4A). Notice that in this case, the larger magnitude IM3 product falls within the RX CDMA2000 band. Consequently, the larger magnitude IM3 product is passed by the RX band-pass filter 62 into a CDMA2000 receiver (not shown). The larger IM3 product will typically desensitize the CDMA2000 receiver to a point of inoperability.

Embodiments of the present disclosure solve the desensitization problem of the prior art by providing an FEM having multi-filter devices that have a cross-duplexer or cross-triplexer configuration. The cross-duplexer or cross-triplexer configuration combines a TX band-pass filter adapted to pass a first TX signal band associated with a first radio access technology type and a RX band-pass filter adapted to pass a second RX signal band associated with a second radio access technology type, and vice versa. In this way, receivers receiving signals through their respective RX band-pass filters will only process the smaller of two IM3 products resulting from an inter-modulation of signals of the first radio access technology type and signals of the second radio access technology type. In the following examples, the first radio access technology type is LTE and the second radio access technology type is CDMA2000. However, it is to be understood that other radio access technology types are usable as the first radio access technology type and the second radio access technology type with embodiments of the present disclosure.

Figure 5:
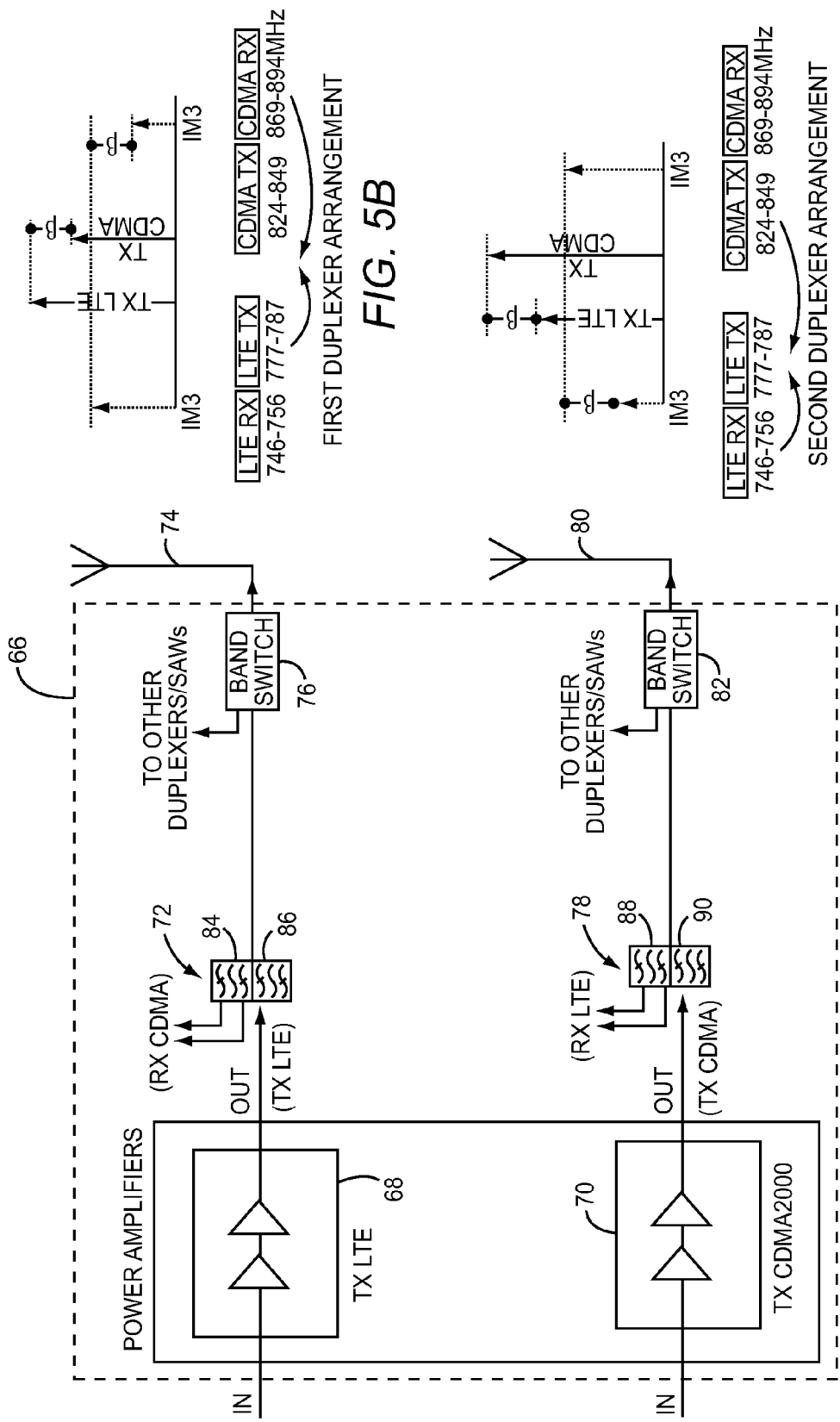
FIG. 5A is a block diagram of an FEM having a cross-duplexer configuration according to the present disclosure.
FIG. 5B is a spectrum diagram showing a smaller of two IM3 products falling within an RX band of CDMA2000 in accordance with the present disclosure.
FIG. 5C is a spectrum diagram showing the smaller of two IM3 products falling within an RX band of LTE in accordance with the present disclosure.

FIG. 5A is a block diagram of an FEM 66 having a cross-duplexer configuration according to the present disclosure. The FEM 66 includes a first PA 68 for amplifying RF signals in a TX band of a first radio access technology type, and a second PA 70 for amplifying RF signals in a TX band of a second radio access technology type. In this case, the first radio access technology type is LTE having a 700 MHz TX band, and the second radio access technology type is CDMA2000 having an 800 MHz TX band. The FEM 66 also includes a first multi-filter device 72 that is coupled to an output of the first PA 68 and selectively coupled to a first T/R antenna 74 through a first band switch 76. The FEM 66 further includes a second multi-filter device 78 that is coupled to an output of the second PA 70 and selectively coupled to a second T/R antenna 80 through a second band switch 82.

In the particular case of the FEM 66, the first multi-filter device 72 is a duplexer having an RX band-pass filter 84 that is tuned to pass signals within a CDMA2000 RX band, and a TX band-pass filter 86 that is tuned to pass signals within an LTE TX band. The second multi-filter device 78 is a duplexer that includes an RX band-pass filter 88 that is tuned to pass signals within an LTE RX band, and a TX band-pass filter 90 that is tuned to pass signals within a CDMA2000 TX band.

Turning now to FIG. 5B, a β isolation due to the physical separation of the first T/R antenna 74 and the second T/R antenna 80 is shown. Also shown are the relative magnitudes of the IM3 products generated by an inter-modulation of LTE and CDMA2000 signals. Notice that in contrast to the spectrum diagram of FIG. 4B, the smaller magnitude IM3 product falls within the RX CDMA2000 band. Thus, the smaller magnitude IM3 product passed by the RX band-pass filter 84 results in significantly less desensitization of an CDMA2000 receiver (not shown) that receives signals passed through the RX band-pass filter 84.

FIG. 5C is a spectrum diagram showing the smaller of two IM3 products falling within an LTE RX band in accordance with the present disclosure. FIG. 5C shows the same β isolation between the first T/R antenna 74 and the second T/R antenna 80 depicted in FIG. 5B. Notice that in this case, the smaller magnitude IM3 product falls within the LTE RX band. Consequently, the smaller magnitude IM3 product is passed by the RX band-pass filter 88 into an LTE receiver (not shown). Operability of the LTE receiver will not be significantly affected by the smaller IM3 product.

Figure 6:
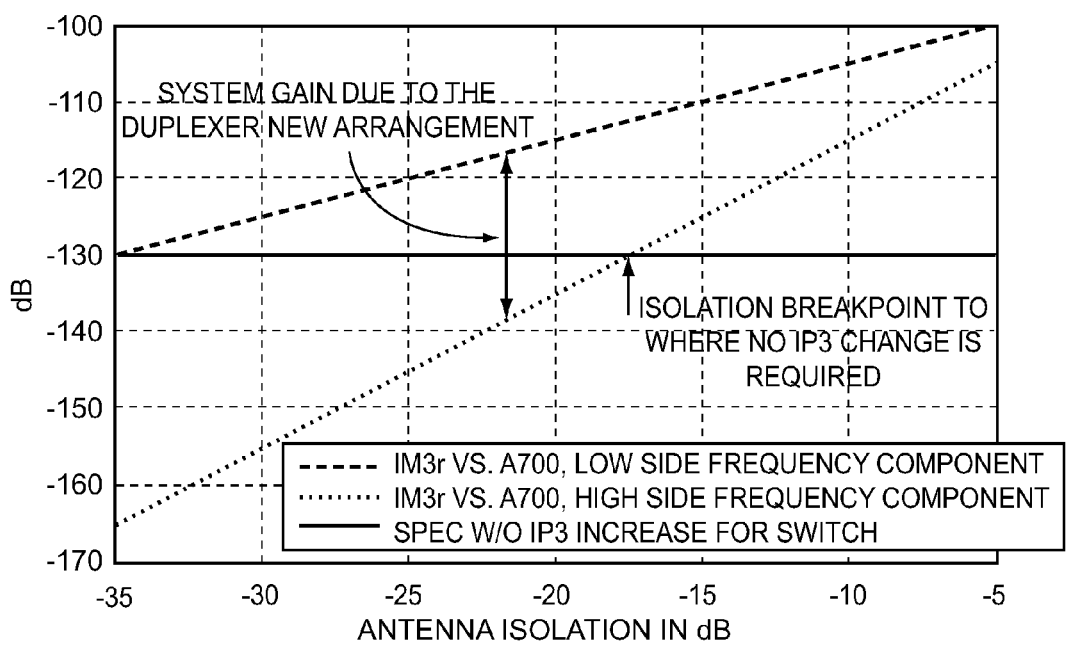
FIG. 6 is a graph quantifying system gain due to the cross-duplexer configuration according to the present disclosure.

FIG. 6 is a graph quantifying system gain due to the cross-duplexer configuration according to the present disclosure. In particular, a plot of the low side component of the third inter-modulation ratio (IM3r) versus the amplitude of a 700 MHz (A700) LTE signal is typical of a prior art FEM that yields 1 dB of third order intercept point (IP3) isolation for each 1 dB increase in antenna isolation (i.e., β delta ratio). In contrast, a plot of the high side component of the IM3r versus an A700 LTE signal that is typical for the cross-duplexer configuration of the present disclosure yields 2 dB of IP3 isolation for each 1 dB of antenna isolation. The significance of this isolation improvement can be better understood with the following example. Suppose a design specification for an FEM according to the present disclosure requires no increase in a −130 dB IP3 due to the addition of a switch that is non-linear. A horizontal line representing the specification without an IP3 increase for the switch intersects the plot of the high side component of the IM3r versus an A700 LTE signal at −17 dB, which is an isolation breakpoint where no IP3 change is required. The −17 dB isolation breakpoint realized using antenna separation spacing and the cross-duplexer of the present disclosure is significantly less challenging to implement than the −35 dB IP3 that is needed for the same requirement using a prior art duplexer.

Figure 7A:
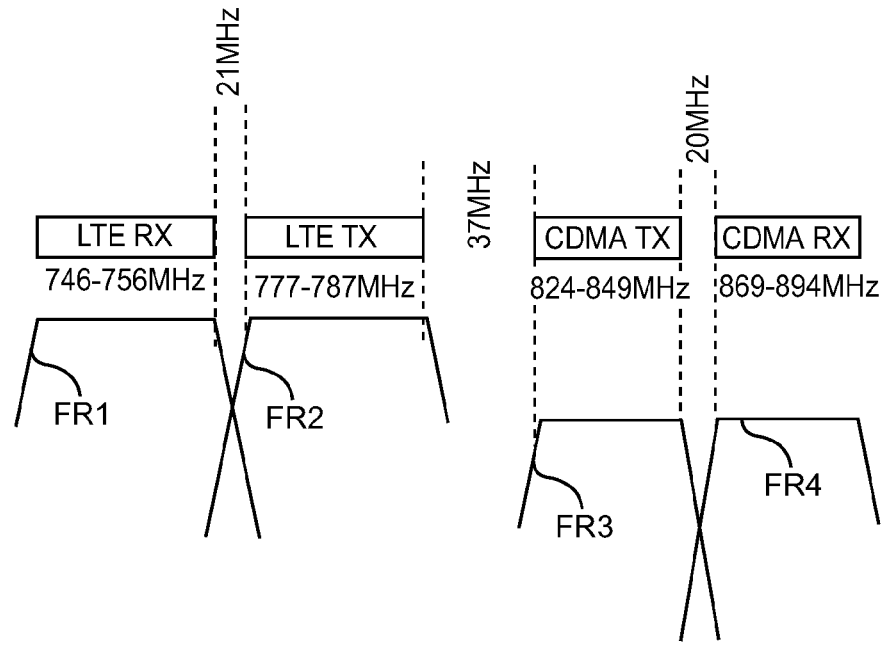
FIG. 7A is a spectrum diagram showing a relatively small isolation of pass bands provided by a typical prior art FEM.
Figure 7B:
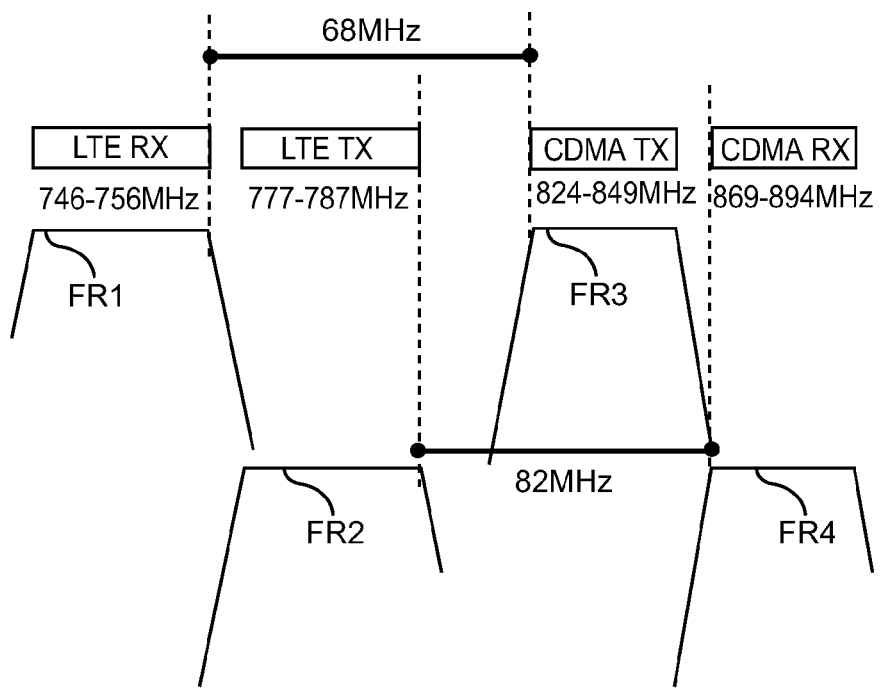
FIG. 7B is a spectrum diagram depicting increased isolation of pass bands due to the cross-duplexer configuration of the present disclosure.

FIG. 7A is a spectrum diagram showing a relatively small isolation of pass bands provided by a typical prior art FEM such as the FEM 24 (FIG. 2). Like FIG. 3, FIG. 7A depicts frequency responses FR1 and FR2 for the first duplexer 26, and frequency responses FR3 and FR4 for the second duplexer 28. FIG. 7B is a spectrum diagram depicting increased isolation of pass bands due to the cross-duplexer configuration of the present disclosure. In this case, the RX band-pass filter 88 of the second multi-filter device 78 (FIG. 5A) is tuned to provide the frequency response FR1, and the TX band-pass filter 86 of the first multi-filter device 72 is tuned to provide the frequency response FR2. Moreover, in order to complete a cross-duplexer configuration, the TX band-pass filter 90 is tuned to provide the frequency response FR3, and the RX band-pass filter 84 is tuned to provide the frequency response FR4. Notice that a band gap between the TX LTE and the RX CDMA2000 bands increases from 21 MHz to 82 MHz in a comparison of the spectrums in FIG. 7A and FIG. 7B. Also notice that a band gap between the TX CDMA2000 and RX TX bands increases from 20 MHz to 68 MHz in a comparison of the spectrums in FIG. 7A and FIG. 7B. This band gap increase improves TX and RX noise figures and reduces TX leakage to significantly improve low noise amplifier (LNA) IIP3 performance.

Figure 8A:
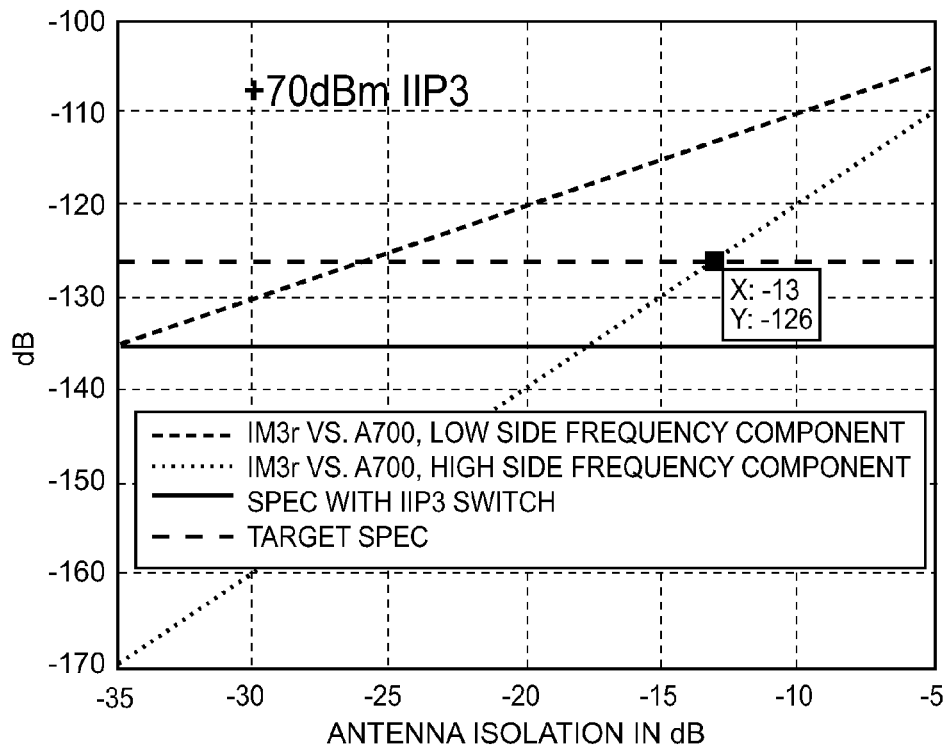
FIG. 8A is a graph of a plot of antenna isolation versus a 70 dBm inter-modulation intercept point 3 (IIP3).
Figure 8B:
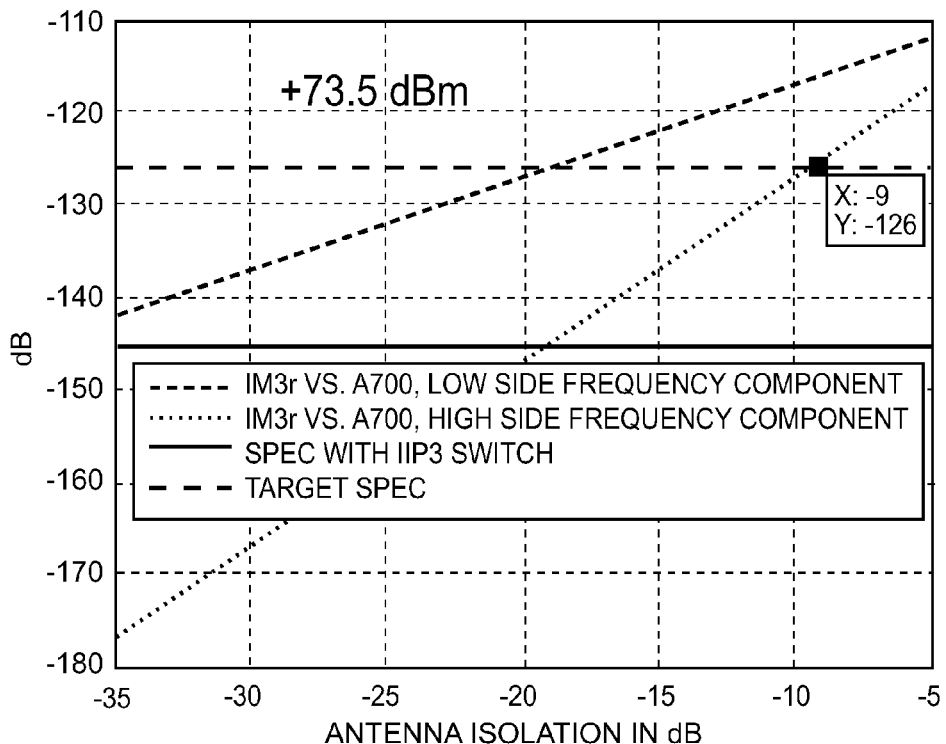
FIG. 8B is a graph of a plot of antenna isolation versus a 73.5 dBm IIP3.
Figure 8C:
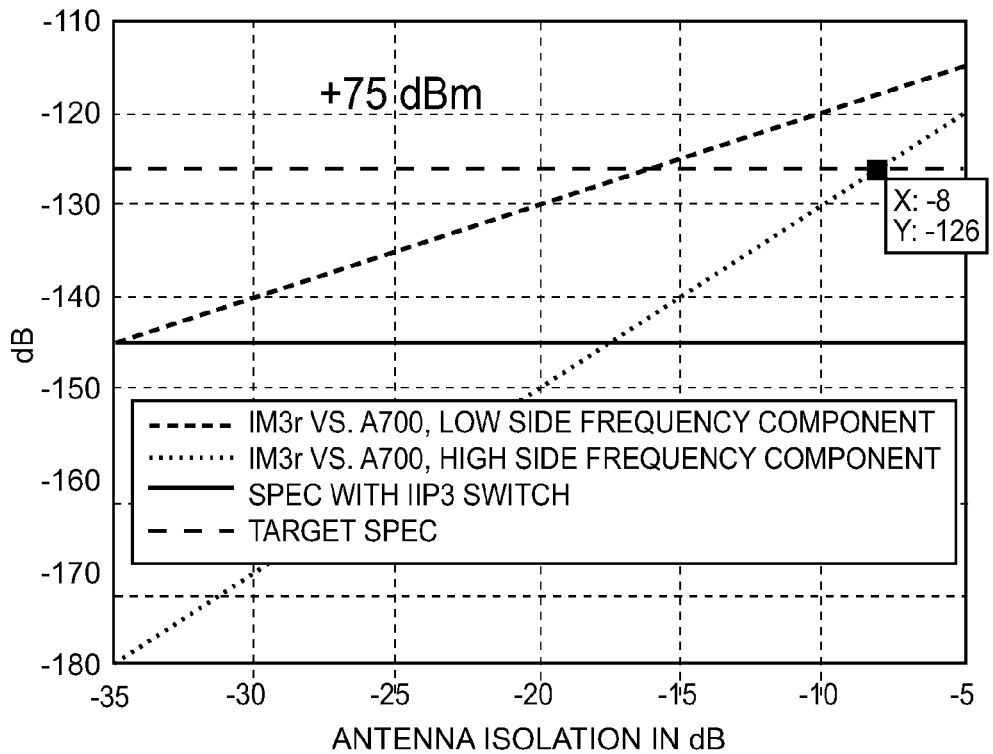
FIG. 8C is a graph of a plot of antenna isolation versus a 75 dBm IIP3.
Figure 8D:
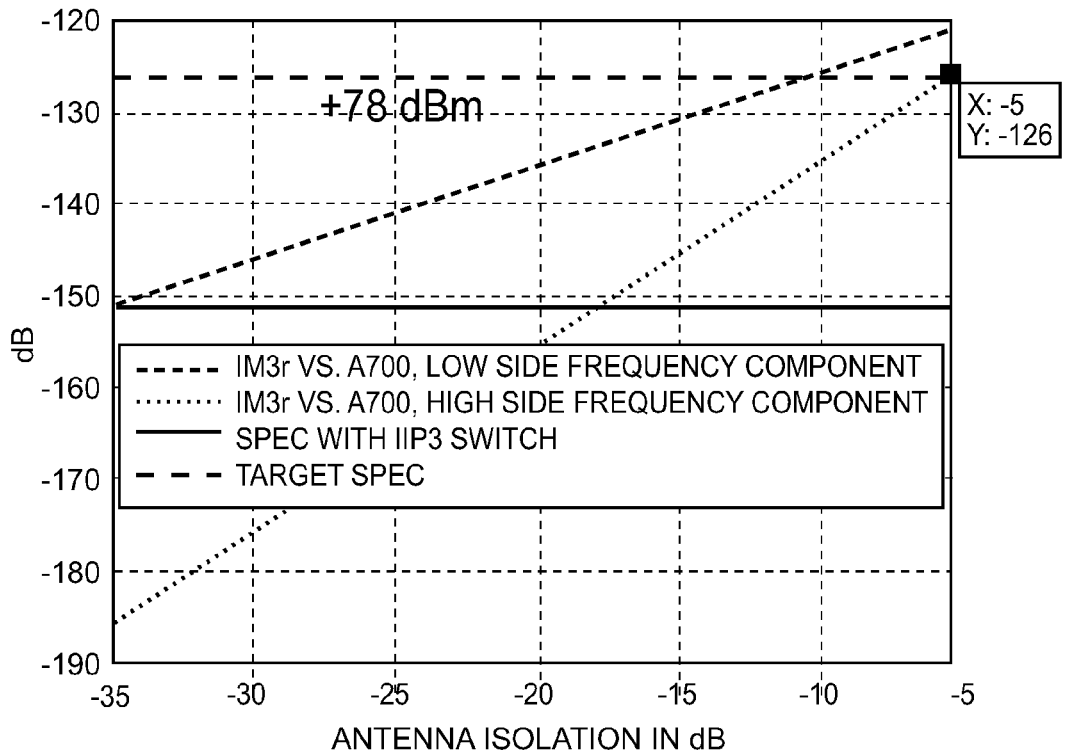
FIG. 8D is a graph of a plot of antenna isolation versus a 78 dBm IIP3.

Due to the improved TX and RX noise figures provided by the cross-duplexer and/or cross-triplexer configurations of the present disclosure, −106 dBm can be allocated to IM3 components for simultaneous voice and data transmission. FIGS. 8A-8D depict various antenna isolation requirements versus IIP3. FIG. 8A is a graph of a plot of antenna isolation versus a 70 dBmm IIP3. An isolation breakpoint plotted on the graph of FIG. 8A is found at x=−13 and y=−126. Thus, the minimum required antenna isolation is 13 dB. FIG. 8B is a graph of a plot of antenna isolation versus a 73.5 dBm IIP3. An isolation breakpoint plotted on the graph of FIG. 8B is found at x=−9 and y=−126. Thus, the minimum required antenna isolation is 9 dB. FIG. 8C is a graph of a plot of antenna isolation versus a 75 dBm IIP3. An isolation breakpoint plotted on the graph of FIG. 8C is found at x=−8 and y=−126. Thus, the minimum required antenna isolation is 8 dB. FIG. 8D is a graph of a plot of antenna isolation versus a 78 dBm IIP3. An isolation breakpoint plotted on the graph of FIG. 8D is found at x=−5 and y=−126. Thus, the minimum required antenna isolation is 5 dB. Fortunately, a minimum antenna isolation of at least 12 dB within the 700 MHz LTE band is easily obtainable, and antenna isolations greater than 13 dB are achievable without an expensive effort.

Figure 9:
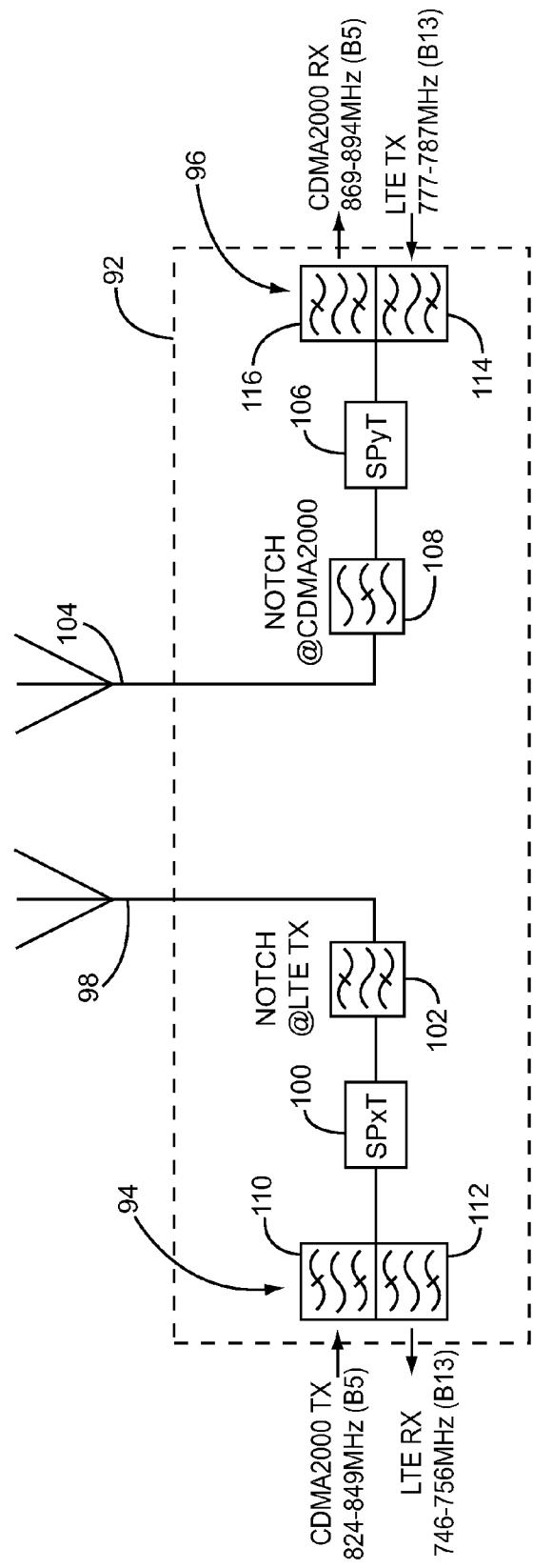
FIG. 9 is a block diagram of an FEM according to the present disclosure having first and second duplexers in a cross-duplexer configuration, wherein the first and second duplexers are communicatively coupled to first and second antennas through first and second RF switches and first and second notch filters.

FIG. 9 is a block diagram of an FEM 92 having a first duplexer 94 and a second duplexer 96 that are each in a cross-duplexer configuration that is in accordance with the present disclosure. The first duplexer 94 is selectively coupled to a first antenna 98 through a first RF switch 100 and a first notch filter 102. The first RF switch 100 is an SPxT switch, where x is the number of switch throws. The second duplexer 96 is selectively coupled to a second antenna 104 through a second RF switch 106 and a second notch filter 108. The second RF switch 106 is a SPyT switch, where y is the number of switch throws.

The first duplexer 94 is made up of a CDMA2000 TX band-pass filter 110 that is tuned to pass signals within a CDMA2000 TX band, and an LTE RX band-pass filter 112 that is tuned to pass signals within an LTE RX band. The second duplexer 96 is made up of an LTE TX band-pass filter 114 that is tuned to pass signals within an LTE TX band, and a CDMA2000 RX band-pass filter 116 that is tuned to pass signals within a CDMA2000 RX band. The first notch filter 102 is adapted to provide at least 6 dB to 8 dB of attenuation for signals in the LTE TX band, whereas the second notch filter 108 is adapted to provide at least 6 dB to 8 dB of attenuation for signals in the CDMA2000 TX band.

Figure 10:
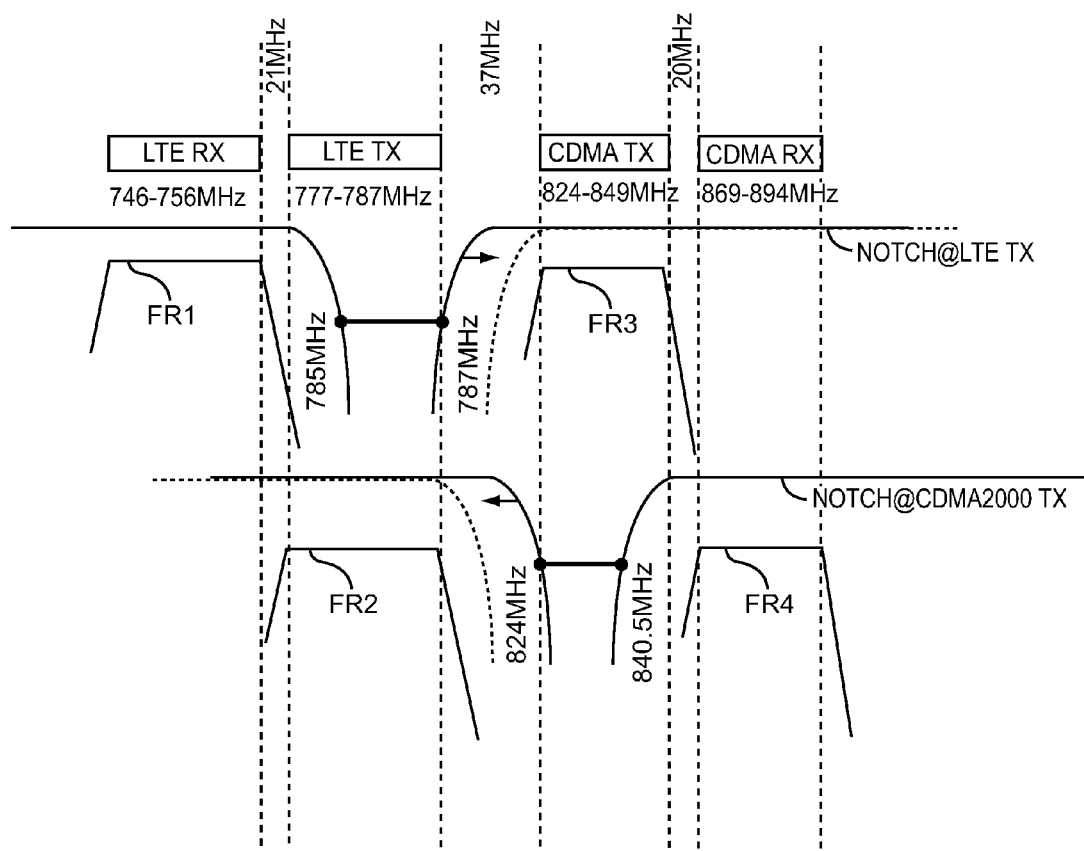
FIG. 10 is a diagram depicting increased isolation of the pass bands due to the cross-duplexer configuration of the FEM of FIG. 9.

FIG. 10 is a spectrum diagram depicting increased isolation of the pass bands due to the cross-duplexer configuration combined with the first notch filter 102 (FIG. 9) and the second notch filter 108. Notice that the first notch filter 102 is tuned to place a notch within the LTE TX band. The bandwidth of the first notch filter 102 is preferably set to be at least 2 MHz. The second notch filter 108 is tuned to place a notch within the CDMA2000 TX band. The bandwidth of the second notch filter 108 is preferably set to be at least 4 MHz.

Figure 11:
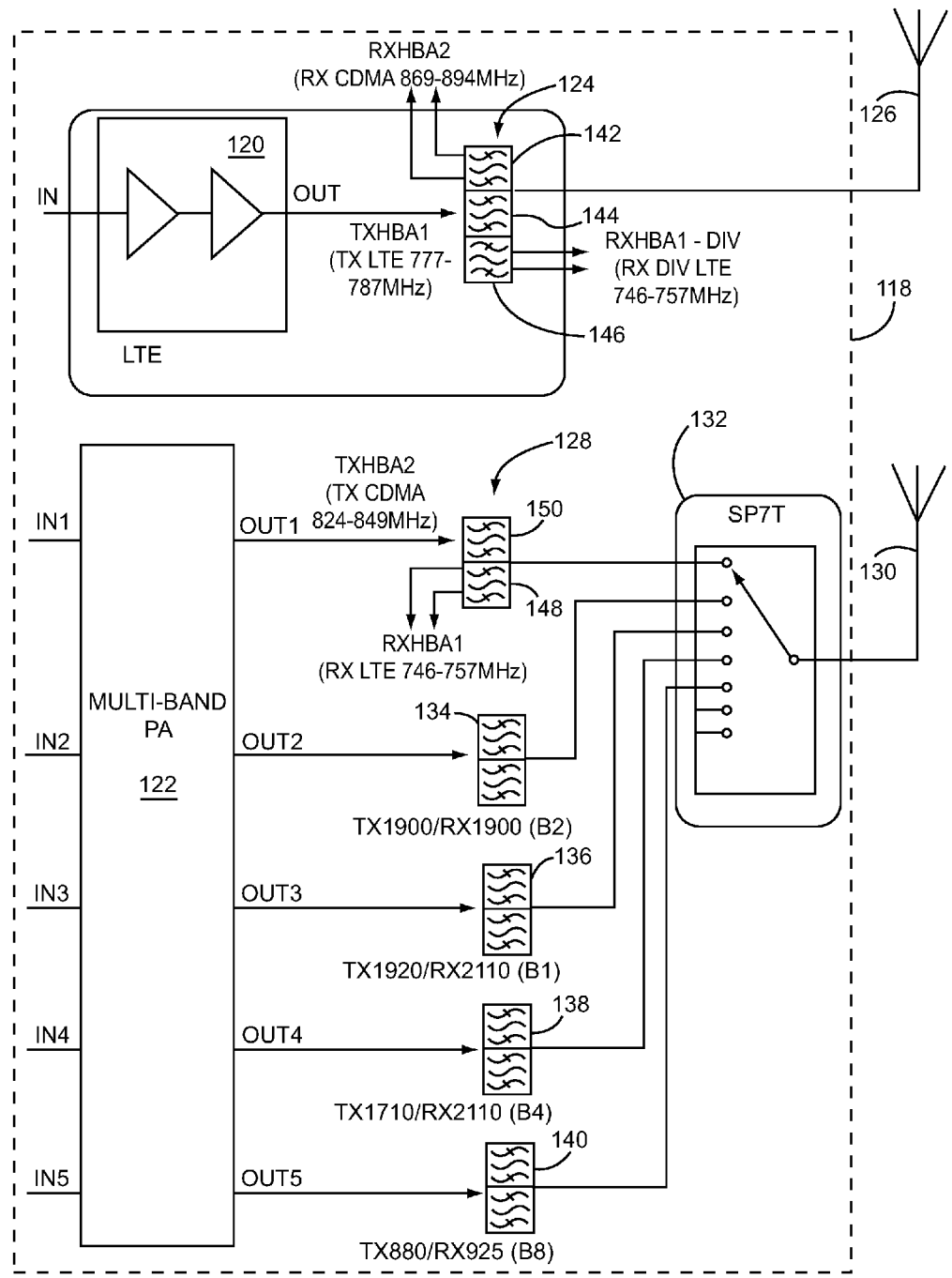
FIG. 11 is a block diagram of an FEM having support for LTE diversity in accordance with the present disclosure.

FIG. 11 is a block diagram of an FEM 118 having support for LTE diversity reception that is in accordance with the present disclosure. The FEM 118 includes a first PA 120 for amplifying RF signals in the TX band of a first radio access technology type, and a second PA 122 for amplifying RF signals in the TX band of a second radio access technology type.

The second PA 122 is a multiband PA that is further adapted to amplify RF signals in multiple bands such as bands B1, B2, B4, and B8. In this case, the first radio access technology type is LTE having a 700 MHz TX band, and the second radio access technology type is CDMA2000 having an 800 MHZ TX band.

The FEM 118 also includes a first multi-filter device 124 that is coupled to the output OUT of the first PA 120. The first multi-filter device 124 in turn is directly coupled to a first T/R antenna 126. The FEM 118 further includes a second multi-filter device 128 that is coupled to an output OUT1 of the second PA 122 and selectively coupled to a second T/R antenna 130 through an RF switch 132. The second PA 122 also has additional amplifier outputs, OUT2, OUT3, OUT4, and OUT5 that are selectively coupled to the second T/R antenna 130 through the RF switch 132. Moreover, B2 signals from the OUT2 are filtered by a filter 134, B1 signals from the OUT3 are filtered by a filter 136, B4 signals from the OUT4 are filtered by a filter 138, and B8 signals from the OUT5 are filtered through a filter 140.

In the particular case of the FEM 118, the first multi-filter device 124 is a triplexer having an RX band-pass filter 142 that is tuned to pass signals within a CDMA2000 RX band, a TX band-pass filter 144 that is tuned to pass signals within an LTE TX band, and an RX band-pass filter 146 that is tuned to pass signals within an RX diversity LTE band. The second multi-filter device 128 is a duplexer that includes an RX band-pass filter 148 that is tuned to pass signals within an LTE RX band, and a TX band-pass filter 150 that is tuned to pass signals within a CDMA2000 TX band. The particular embodiment of the FEM 118 does not require an RF switch in a transmit path that connects an output OUT of the first PA 120 to the first T/R antenna 126.

Figure 12:
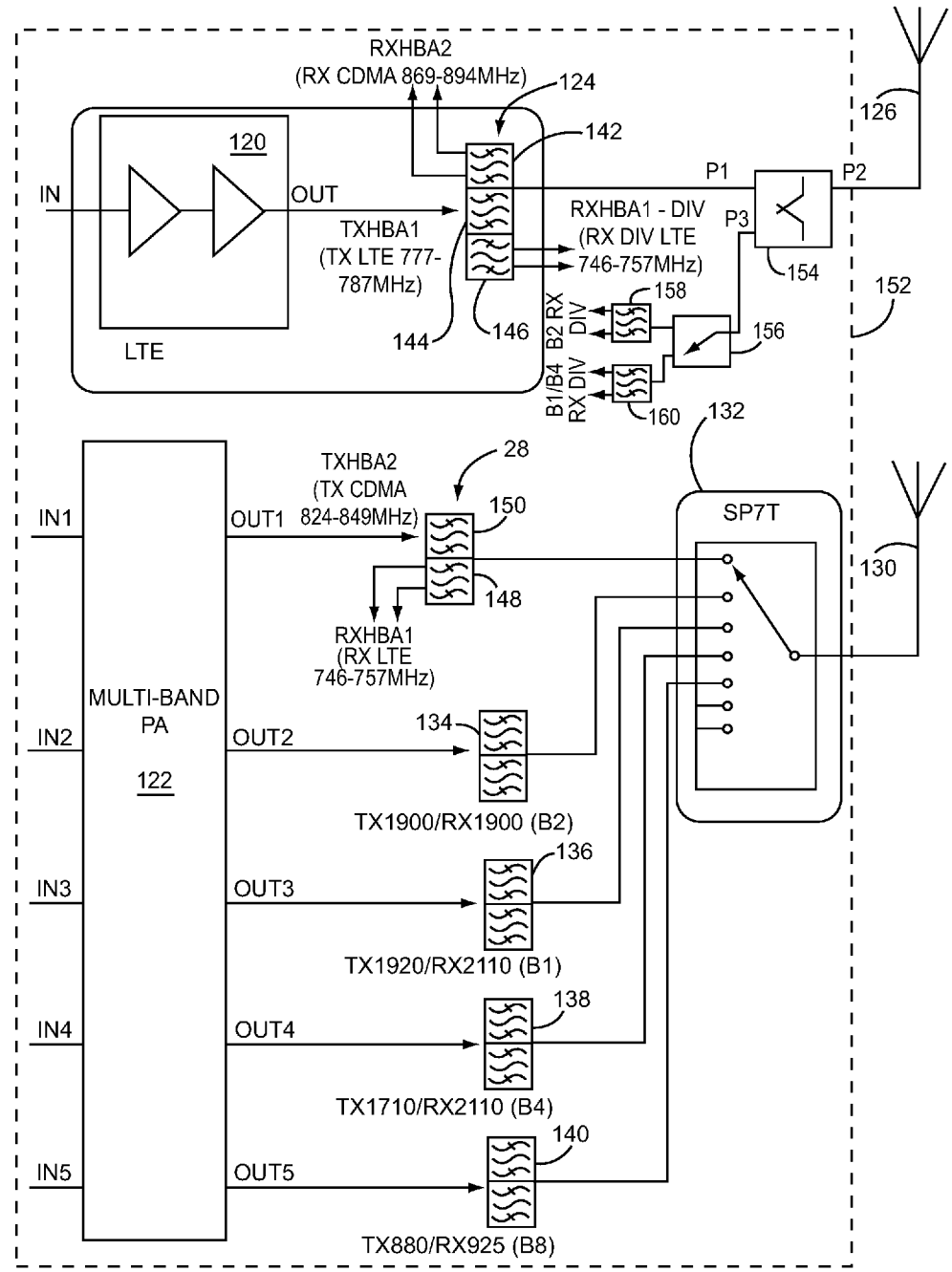
FIG. 12 is a block diagram of an FEM according to the present disclosure that supports multi-band operation in addition to a dual TX mode including a cross multi-filter configuration that includes a duplexer and a triplexer.

FIG. 12 is a block diagram of an FEM 152 that adds a high band/low band (HB/LB) diplexer 154 between the first multi-filter device 124 and the first T/R antenna 126. In particular, the HB/LB diplexer 154 has a first port P1 coupled to the first multi-filter device 124, a second port P2 coupled to the first T/R antenna 126, and a third port P3 coupled to a single pole double throw (SP2T) RF switch 156. An LTE band 2 (B2) diversity RX filter 158 and an LTE band 1/band 4 (B1/B4) diversity RX filter 160 are selectively coupled to the HB/LB diplexer 154 through the SP2T RF switch 156. The diversity RX filter 158 and the diversity are preferably surface acoustical wave (SAW) filters.

Figure 13:
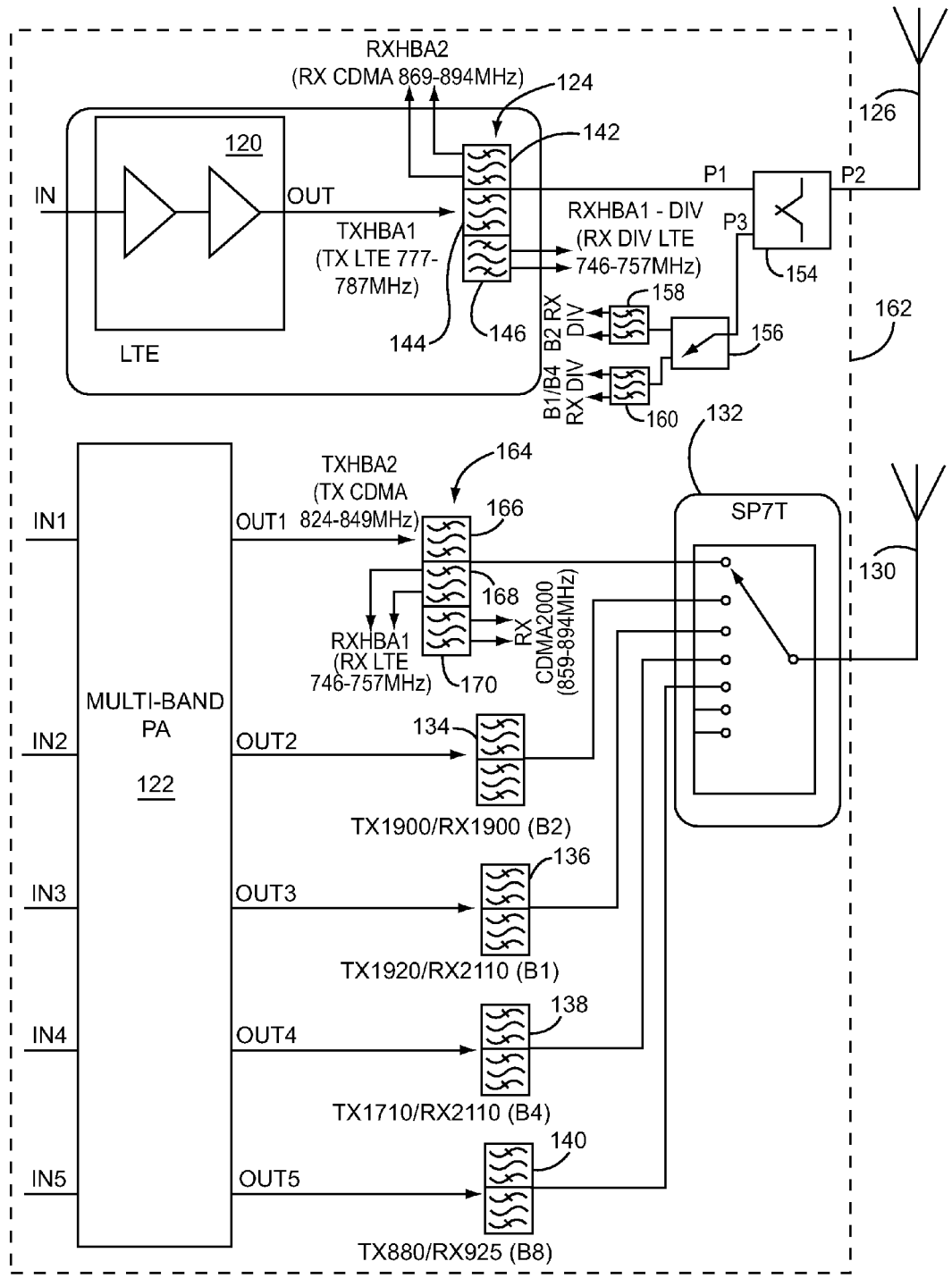
FIG. 13 is a block diagram of an FEM according to the present disclosure that supports diversity reception of CDMA2000.

FIG. 13 is a block diagram of an FEM 162 having support for CDMA2000 diversity reception that is in accordance with the present disclosure. In particular, the FEM 162 includes a triplexer 164 that replaces the second multi-filter device 128 (FIGS. 11 and 12). The triplexer 164 is made up of a TX band-pass filter 166 that is tuned to pass signals within a CDMA2000 TX band, an RX band-pass filter 168 that is tuned to pass signals within an LTE RX band, and a diversity RX band-pass filter 170 that is tuned to pass signals within an RX diversity CDMA2000 band.

Figure 14:
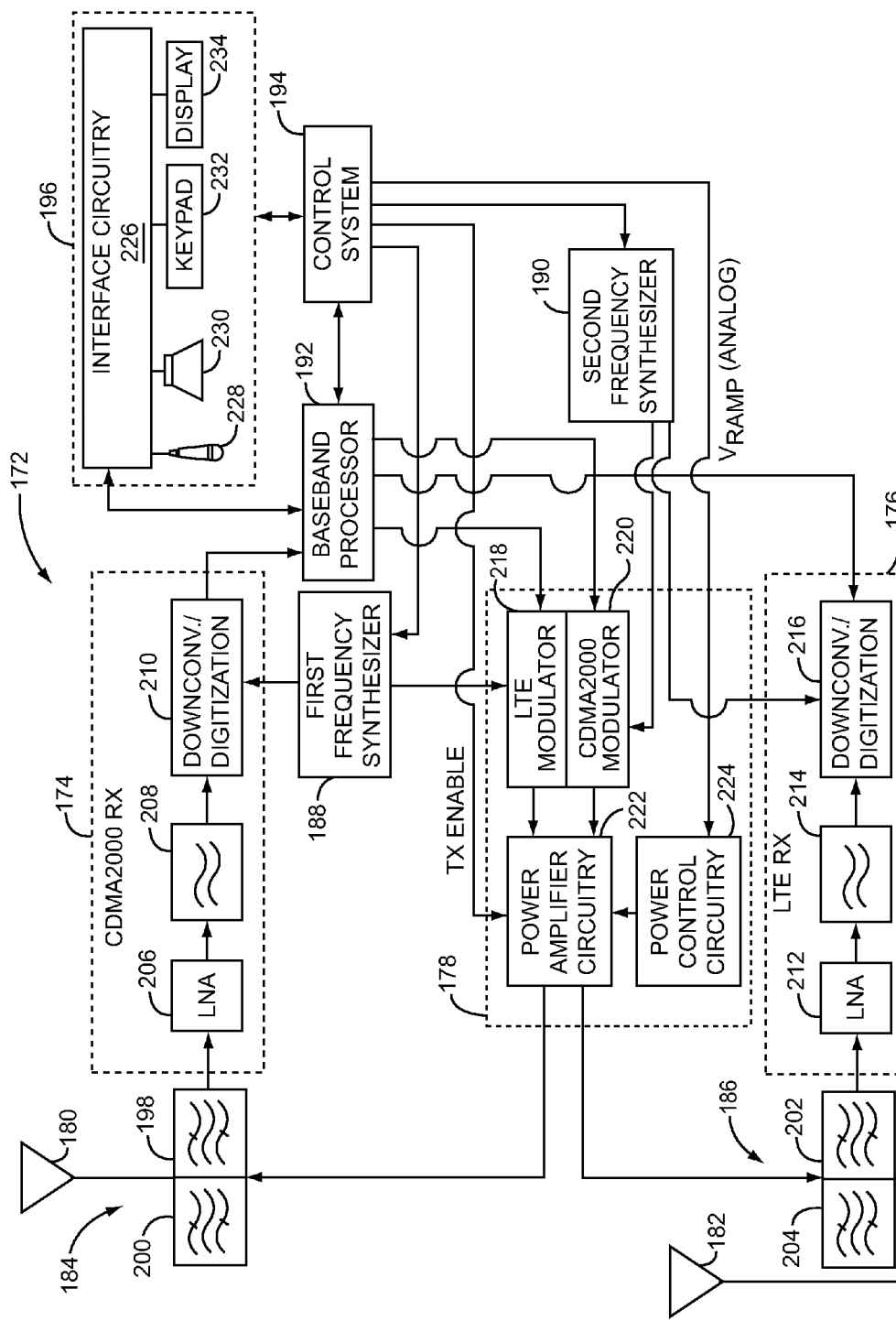
FIG. 14 is a block diagram of a user equipment (UE) in the form of a mobile terminal that is usable with the FEM of the present disclosure.

FIG. 14 depicts a mobile terminal 172, such as a mobile telephone, personal digital assistant (PDA), personal computer, or the like, that makes up a UE of the present disclosure. The basic architecture of the mobile terminal 172 may include a CDMA2000 RX front end 174, an LTE RX front end 176, an RF transmitter section 178, a first T/R antenna 180, a second T/R antenna 182, a first duplexer 184, a second duplexer 186, a first frequency synthesizer 188, a second frequency synthesizer 190, a baseband processor 192, a control system 194, and an interface 196.

The first duplexer 184 and the second duplexer 186 have cross-duplexer configurations in accordance with the present disclosure. In particular, the first duplexer 184 is made up of an RX band-pass filter 198 that is tuned to pass signals within a CDMA2000 RX band, and a TX band-pass filter 200 that is tuned to pass signals within an LTE TX band. The second duplexer 186 is made up of an RX band-pass filter 202 that is tuned to pass signals within an LTE RX band, and a TX band-pass filter 204 that is tuned to pass signals within a CDMA2000 TX band.

The CDMA2000 RX front end 174 receives information-bearing RF signals from one or more remote transmitters provided by a base transceiver station (BTS) (not shown). An LNA 206 amplifies the RF signal captured by the first T/R antenna 180. A CDMA2000 filter circuit 208 minimizes broadband interference in the RF signal, while a CDMA2000 downconverter 210 downconverts the filtered, received RF signal to an intermediate or baseband frequency signal, which is then digitized into one or more digital streams. The CDMA2000 RX front end 174 typically uses one or more CDMA2000 mixing frequencies generated by the first frequency synthesizer 188.

The LTE RX front end 176 receives information-bearing RF signals from one or more remote transmitters provided by a BTS (not shown). An LNA 212 amplifies the RF signal captured by the second T/R antenna 182. An LTE filter circuit 214 minimizes broadband interference in the RF signal, while an LTE downconverter 216 downconverts the filtered, received RF signal to an intermediate or baseband frequency signal, which is then digitized into one or more digital streams. The CDMA2000 RX front end 174 typically uses one or more LTE mixing frequencies generated by the second frequency synthesizer 190.

The baseband processor 192 processes the digitized received CDMA2000 and LTE signals to extract the information or data bits conveyed in the received CDMA2000 and LTE signals. This processing typically comprises demodulation, decoding, and error correction operations. As such, the baseband processor 192 is generally implemented in one or more digital signal processors (DSPs).

On the transmit side, the baseband processor 192 receives digitized data, which it encodes for transmission, from the control system 194. The encoded data is output to the RF transmitter section 178, where it is used by an LTE modulator 218 and a CDMA2000 modulator 220 to modulate carrier signals that have desired transmit frequencies. PA circuitry 222 amplifies the modulated carrier signals to a level appropriate for transmission from the first T/R antenna 180 and the second T/R antenna 182. The PA circuitry 222 provides gain for the modulated carrier signals to be transmitted under control of power control circuitry 224, which is preferably controlled by the control system 194 using an adjustable power control signal ($V_{RAMP}$).

The power control circuitry 224 adjusts the bias for the PA circuitry 222 to maintain a desired output power under varying conditions, such as decreasing battery voltage and/or fluctuating voltage standing wave ratio (VSWR), etc. The control system 194 may also provide a transmit enable signal (TX ENABLE) to effectively enable the PA circuitry 222 during periods of transmission.

A user may interact with the mobile terminal 172 via the interface 196, which may include interface circuitry 226 associated with a microphone 228, a speaker 230, a keypad 232, and a display 234. The interface circuitry 226 typically includes analog-to-digital converters, digital-to-analog converters, amplifiers, and the like. Additionally, the interface circuitry 226 may include a voice encoder/decoder, in which case it may communicate directly with the baseband processor 192.

The microphone 228 will typically convert audio input, such as the user's voice, into an electrical signal, which is then digitized and passed directly or indirectly to the baseband processor 192. Audio information encoded in the received signal is recovered by the baseband processor 192 and converted into an analog signal suitable for driving the speaker 230 and the interface circuitry 226. The keypad 232 and the display 234 enable the user to interact with the mobile terminal 172, inputting numbers to be dialed, address book information, or the like, as well as monitoring call progress information.

Those skilled in the art will recognize improvements and modifications to the preferred embodiments of the present disclosure. All such improvements and modifications are considered within the scope of the concepts disclosed herein and the claims that follow.

What is claimed is:

1. A user equipment (UE) front end (FE) adapted for multi-band simultaneous transmission and reception of voice and data, the UE FE comprising:
    a first duplexer having a TX band-pass filter adapted to pass a first TX signal band associated with a first radio access technology type and an RX band-pass filter adapted to pass a second RX signal band associated with a second radio access technology type;
    a second duplexer having a TX band-pass filter adapted to pass a second TX signal band associated with the second radio access technology type, and an RX band-pass filter adapted to pass a first RX signal band associated with the first radio access technology type; and
    a first notch filter that is communicatively coupled to the first duplexer, wherein the first notch filter provides a notch at a TX band for the second radio access technology type.

2. The UE FE of claim 1, wherein the first radio access technology type is long term evolution (LTE), and the second radio access technology type is code division multiple access 2000 (CDMA2000).

3. The UE FE of claim 1, further including a second notch filter that is communicatively coupled to the second duplexer, wherein the second notch filter provides a notch at a TX band for the first radio access technology type.

4. A user equipment (UE) front end (FE) adapted for multi-band simultaneous transmission and reception of voice and data, the UE FE comprising:
    a first multi-filter device having a TX band-pass filter adapted to pass a first TX signal band associated with a first radio access technology type and an RX band-pass filter adapted to pass a second RX signal band associated with a second radio access technology type;
    a second multi-filter device having a TX band-pass filter adapted to pass a second TX signal band associated with the second radio access technology type and an RX band-pass filter adapted to pass a first RX signal band associated with the first radio access technology type, and
    a first notch filter that is communicatively coupled to the first multi-filter device, wherein the first notch filter provides a notch at a TX band for the second radio access technology type.

5. The UE FE of claim 4, further including a second notch filter that is communicatively coupled to the second multi-filter device, wherein the second notch filter provides a notch at a TX band of the first radio access technology type.

6. The UE FE of claim 4, wherein the first multi-filter device is a duplexer.

7. The UE FE of claim 4, wherein the second multi-filter device is a duplexer.

8. The UE FE of claim 4, wherein the first multi-filter device is a triplexer.

9. The UE FE of claim 8, wherein the first multi-filter device further includes a diversity RX band-pass filter adapted to pass a first RX diversity signal band associated with the first radio access technology type.

10. The UE FE of claim 4, wherein the second multi-filter device is a triplexer.

11. The UE FE of claim 10, wherein the second multi-filter device further includes a diversity RX band-pass filter adapted to pass a second RX diversity signal band associated with the second radio access technology type.

12. The UE FE of claim 4, wherein the first radio access technology type is long term evolution (LTE) and the second radio access technology type is CDMA2000.

13. A user equipment (UE) adapted for multiband simultaneous transmission and reception of voice and data, the UE comprising:
- a first antenna;
- a second antenna; and
- a UE front end (FE) comprising:
  - a first power amplifier (PA) for transmitting signals of a first radio access technology type;
  - a second PA for transmitting signals of at least a second radio access technology type;
  - a first multi-filter device having a transmit (TX) band-pass filter adapted to pass a first TX signal band associated with the first radio access technology type and a receive (RX) band-pass filter adapted to pass a second RX signal band associated with the second radio access technology type, wherein the first multi-filter device has an input coupled to the first PA and an output coupled to the first antenna;
  - at least a second multi-filter device having a TX band-pass filter adapted to pass a second TX signal band associated with the second radio access technology type and an RX band-pass filter adapted to pass a first RX signal band associated with the first radio access technology type, wherein the at least a second multi-filter device has an input coupled to the second PA and an output that is selectively coupled to the second antenna via a first radio frequency (RF) switch; and
  - a high band/low band diplexer having a first port coupled to the first multi-filter device, a second port coupled to the first antenna, and a third port coupled to a second RF switch for selectively coupling the high band/low band diplexer to a first diversity RX band-pass filter and a second diversity RX band-pass filter.

14. The UE of claim 13, wherein the first radio access technology type is long term evolution (LTE), and the second radio access technology type is code division multiple access 2000 (CDMA2000).

15. The UE of claim 13, wherein the first multi-filter device is a triplexer that further includes a diversity RX band-pass filter adapted to pass a first RX diversity signal band associated with the first radio access technology type.

16. The UE of claim 13, wherein the at least a second multi-filter device is a triplexer that further includes a diversity RX band-pass filter adapted to pass a second RX diversity signal band associated with the second radio access technology type.

17. The UE of claim 13, wherein either the first antenna or the second antenna is a diversity antenna that is adapted for use as a transmit and receive (T/R) antenna.

18. A user equipment (UE) adapted for multiband simultaneous transmission and reception of voice and data, the UE comprising:
- a first antenna;
- a second antenna; and
- a UE front end (FE) comprising:
  - a first power amplifier (PA) for transmitting signals of a first radio access technology type;
  - a second PA for transmitting signals of at least a second radio access technology type;
  - a first multi-filter device having a transmit (TX) band-pass filter adapted to pass a first TX signal band associated with the first radio access technology type and a receive (RX) band-pass filter adapted to pass a second RX signal band associated with the second radio access technology type, wherein the first multi-filter device has an input coupled to the first PA and an output that is selectively coupled to the first antenna via a first radio frequency (RF) switch;
  - at least a second multi-filter device having a TX band-pass filter adapted to pass a second TX signal band associated with the second radio access technology type and an RX band-pass filter adapted to pass a first RX signal band associated with the first radio access technology type, wherein the at least a second multi-filter device has an input coupled to the second PA and an output that is selectively coupled to the second antenna via a second RF switch; and
  - a high band/low band diplexer having a first port coupled to the first multi-filter device, a second port coupled to the first antenna, and a third port coupled to a third RF switch for selectively coupling the high band/low band diplexer to a first diversity RX band-pass filter and a second diversity RX band-pass filter.

19. The UE of claim 18, wherein the first radio access technology type is long term evolution (LTE), and the second radio access technology type is code division multiple access 2000 (CDMA2000).

20. The UE of claim 18, wherein the first multi-filter device is a triplexer that further includes a diversity RX band-pass filter adapted to pass a first RX diversity signal band associated with the first radio access technology type.

21. The UE of claim 18, wherein the at least a second multi-filter device is a triplexer that further includes a diversity RX band-pass filter adapted to pass a second RX diversity signal band associated with the second radio access technology type.

22. The UE of claim 18, wherein either the first antenna or the second antenna is a diversity antenna that is adapted for use as a transmit and receive (T/R) antenna.

* * * * *